United States Patent
Pollard et al.

(10) Patent No.: US 6,266,439 B1
(45) Date of Patent: Jul. 24, 2001

(54) IMAGE PROCESSING APPARATUS AND METHODS

(75) Inventors: Stephen Bernard Pollard, Gloucestershire; Claus Henrik Pedersen, Bristol, both of (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/714,839

(22) Filed: Sep. 6, 1996

(30) Foreign Application Priority Data

Sep. 29, 1995 (EP) .................................................. 95306931

(51) Int. Cl.⁷ ...................................................... G06K 9/00
(52) U.S. Cl. ............................ 382/164; 382/173; 382/254
(58) Field of Search ..................................... 382/176, 164, 382/171, 173, 170, 254; 358/1.115–1.16, 300

(56) References Cited

U.S. PATENT DOCUMENTS

| | | | |
|---|---|---|---|
| 5,134,666 | 7/1992 | Imao | 382/164 |
| 5,134,667 * | 7/1992 | Suzuki | 382/164 |
| 5,189,523 | 2/1993 | Sugiura et al. | 358/300 |
| 5,513,277 * | 4/1996 | Huttenlocher | 382/171 |
| 5,613,015 * | 3/1997 | Suzuki et al. | 382/173 |
| 5,696,842 * | 12/1997 | Shirasawa et al. | 382/176 |
| 5,774,578 * | 6/1998 | Shimizu | 382/170 |

FOREIGN PATENT DOCUMENTS

| | | | |
|---|---|---|---|
| 0348145 | 12/1989 | (EP) | H04N/1/387 |
| 0395032 | 10/1990 | (EP) | G03G/15/01 |
| 0463844A2 | 1/1992 | (EP) | H04N/1/46 |

* cited by examiner

*Primary Examiner*—Leo Boudreau
*Assistant Examiner*—Ishrat Sherali

(57) ABSTRACT

An image processor receives color signals representing a color or black-and-white image, typically containing text and non-text areas. A sliding window or swath of the image is processed which progressively moves over the virtual image.

A spatial filter is applied to sharpen the image and it is then classified into text and non-text regions. The data from the text regions is subjected to a black text enhancement process in which the color signal from a single channel (here the green channel) is thresholded against two thresholds, T1, T2. The lower (darker) threshold T2 identifies pixels for being set to black, whereas the threshold T1 identifies "support" pixels used in component connectivity analysis. Having defined a connected component using both T1 and T2 pixels, the color statistics of the pixels making up the component are analyzed to determine whether the component should be rendered black. If so, the image data is enhanced by snapping the T2 pixels to black, and snapping a halo of pixels around the black text component to white.

10 Claims, 9 Drawing Sheets

| 1 | 1 | 1 | 1 | 1 |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |
× 1/25
Fig. 5
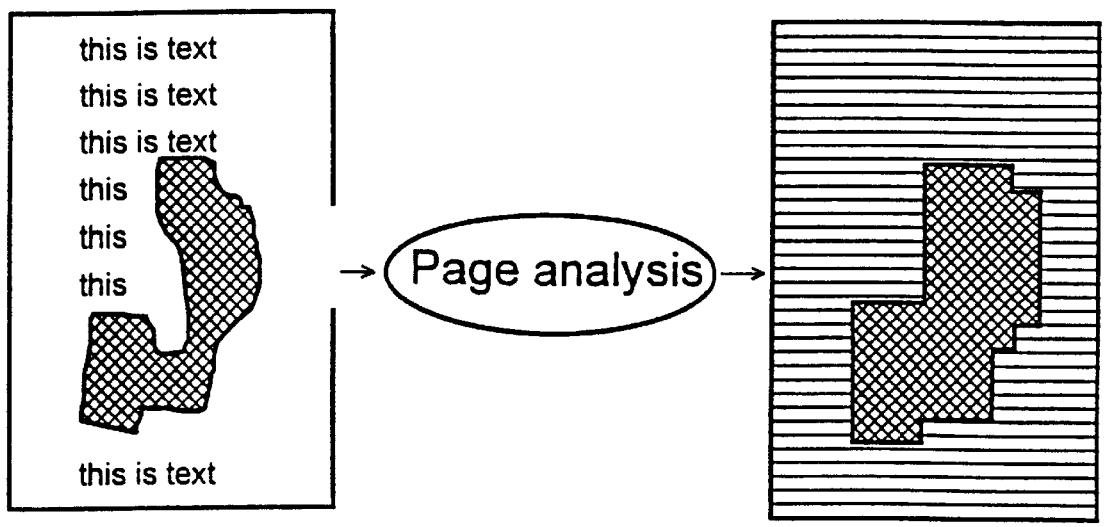
Page
(rgb data)
 Image
Classification
 Text-area
 Not Text-area
Fig. 6

☒ Pixels Below Threshold T1
☒ Pixels Also Below Threshold T2

☒ Pixels Below Threshold T1
☒ Pixels Also Below Threshold T2

| | BLACK Pixels | (1000) |
| | T2_COMPONENT Pixels | (0101) |
| | T1_COMPONENT Pixels | (0100) |
| | WHITE Pixels | (0010) |
| □ | NOT_SET | (0000) |

IMAGE PROCESSING APPARATUS AND METHODS

BACKGROUND OF THE INVENTION

This invention relates to image processing apparatus and methods for processing digital colour data representing a colour or black-and-white image to enhance the rendition of text in presentations of said image, and in particular, but not exclusively, to such apparatus and methods for use in a colour scanner printer, copier, facsimile or the like.

In many existing designs of colour copier, the original image is scanned and digitised to provide red, green and blue (RGB) digital signals representing the relative intensities of these three colours at each pixel of the scanned image. The RGB data is converted to cyan, magenta, yellow and black (CMYK) signals by a colour processing pipeline, and the CMYK signals are used to control the amount of cyan, magenta, yellow and black ink or toner deposited at the appropriate pixel in the printed image.

Whilst the colour processing pipeline is able to deal appropriately with continuous tone colour image data, it does not perform well with areas of text, i.e. the processing of simple text on a white or plain coloured background. Due to a mixture of scanner inaccuracies and the non-linearities in the colour mapping between RGB and CMYK, which are desirable for continuous tone and to push near white background regions to white, the text tends to be rendered both too light and with too much colour in and around it. The adverse effects on coloured text or black text on coloured background are perceived as being less critical. Similar problems arise in equipment other than copiers, for example laser or ink-jet colour printers, colour display units, colour scanners and the like, where the image is represented as a collection of chromatic signals.

U.S. Pat. No. 5,189,523 discloses a system in which an image is scanned in a first scan to provide a discrimination signal, for example, using an edge extraction filter and a "black judgement" step. The discrimination data is stored in a bit map memory which is then used during a second scan to control whether data from the second scan is enhanced or used raw.

European Published Application No. 463,844 discloses a system in which an input image is processed to enhance the boundary region between a text letter or item and the background. Both these earlier proposals concentrate on the edge or interface between black and white; they do not take into account further features within the image components or connectivity, and so in some instances may highlight the edge of a text glyph whilst degrading its overall form.

SUMMARY OF THE INVENTION

We have developed an improved apparatus and method for text enhancement in which the physical regions bounded by a potential text item or glyph are determined and the colour data therein monitored, to discriminate black text items.

Accordingly, in one aspect, this invention provides image processing apparatus for processing colour signals representing a colour or black-and-white image, to enhance the rendition of black text in a subsequent presentation of said image, said apparatus comprising:

(i) means for analysing at least one of said colour signals over said image or a part thereof to identify within said image or part thereof one or more groups of neighbouring pixels, each of which defines a potential text item;

(ii) colour discriminating means for monitoring at least some of the colour signals of pixels within and/or around each potential text item to discriminate one or more black text items, and (iii) means for enhancing said one or more discriminated black text items in a subsequent presentation of said image.

For convenience, the phrases "black text item" and the like are used to define black text items, near black text items, or indeed any other foreground text items, including white foreground on a black background.

The analysing means preferably compares the intensity of said colour signal in each pixel with a first threshold and classifies each pixel having an intensity below said first threshold as belonging to a potential text item, and the apparatus preferably includes means for storing data identifying each potential text item and the pixels belonging thereto.

Where the colour signals comprise the usual red, green and blue colour signals, the means for analysing preferably analyses the green colour signals.

The colour discriminating means preferably monitors the red, green and blue intensities of each of the pixels making up the potential text item. In a preferred embodiment, said colour discriminating means includes, for each colour channel, means for accumulating a value representing an estimate for each colour channel.

The means for enhancing preferably sets each of the pixels within each discriminated black text item to black. We have found it beneficial to configure the apparatus so that the means for enhancing sets to black only those pixels where the intensity of said colour signal is below a second threshold, lower than the first threshold mentioned above.

Preferably, said means for enhancing includes means for setting the colour signals of selected pixels adjacent said discriminated black text item to make up white or another suitable background colour.

The image processing apparatus preferably includes means for classifying the image into potential text areas and non-text areas, so that the analysing means may analyse the colour signals only in text regions.

Said means for classifying preferably includes means for defining selected cells or regions within said image, means for monitoring within each cell or region the values of the colour signals for selected pixels to determine data representing the statistical distribution of the intensities of the colour signals for said selected pixels, and means for identifying said selected region as a text area or a non-text area dependent on said statistical distribution. Said means for monitoring may determine peaks in the statistical distribution data for each channel.

Said means for identifying preferably includes means for comparing said statistical distribution data with a black intensity maximum threshold and a white intensity minimum threshold, said white intensity minimum threshold being set as required to capture both pure white and off-white backgrounds. A selected region is identified as a text region if it does not include a peak between said black intensity maximum threshold and said white intensity minimum threshold, and if it meets one or both of the following conditions:

(i) it includes a peak above the white minimum threshold, and (ii) it includes a peak below the black maximum threshold.

The above technique indicates black on white or white on black. For more general colour discrimination, in one embodiment, to avoid visiting each possible triplet combination ($256^3$ in all for 8-bit RGB), the apparatus includes means for determining intensity statistical distribution data for each colour signal separately, means for identifying peaks in the statistical distribution data for each colour signal, means for selecting restricted search spaces corresponding to said peaks, each restricted search space preferably being defined using the intensity values for said peaks, and means for assessing the population in each of said search spaces, whereby the presence of a highly-populated search space corresponding to combinations of colour signals making up black or near black, and another highly-populated search space corresponding to colour signals making up white, near white or a lightly-coloured background (as defined by the white intensity minimum threshold), indicates that the selected region is a text area.

To reduce the size of memory required for processing, and to avoid the need to store a complete image or page before being able to start outputting processed colour signals, the apparatus preferably includes means for storing a sliding window or swath of the image, with said means for analysing and said colour discriminating means operating on said sliding window or swath.

In another aspect, this invention provides an image processing method for processing colour signals representing a colour or black-and-white image, to enhance the rendering of black text in a subsequent presentation of said image, said method comprising:

(i) analysing at least one of said colour signals over said image or a part thereof groups of neighbouring pixels, each of which defines a potential text item or part thereof;

(ii) monitoring at least some of the colour signals of pixels within and/or around each potential text item to discriminate black text items, and (iii) enhancing said discriminated black text items in a subsequent presentation of said image.

The invention also extends to apparatus and methods for image processing, wherein an input image is classified into potential text and non-text regions by monitoring the intensities of at least some of the colour signals at a plurality of pixels within a selected region of said image, using said monitored intensities to determine intensity distribution data for the or each colour signal, and then classifying said selected region as a text region or non-text region.

Whilst the invention has been described above, it extends to any inventive combination of the features set out above or in the following description. Preferably, the apparatus includes means such as a sharpening filter for sharpening said image.

BRIEF DESCRIPTION OF THE DRAWINGS

The invention may be performed in various ways and, by way of example only, an embodiment thereof and certain modifications will now be described in detail, reference being made to the accompanying drawings, in which:

FIG. 5 is a schematic diagram of a 5×5 lowpass filter used in the image-sharpening step in this embodiment;

FIG. 6 is a schematic diagram illustrating in overview the page analysis step in this embodiment;

SYSTEM OVERVIEW

The illustrated embodiment of the apparatus of this invention receives RGB digital colour signals representing a colour image which may typically contain text and non-text areas, for example a page which includes several photographs and interspersed with text. The colour signals are processed so that when the image is rendered, for example by a colour ink jet print engine, the detrimental defects normally observed in such devices, such as the discolouration of supposedly black text items and degradation of the edges are reduced or avoided.

Figure 1:
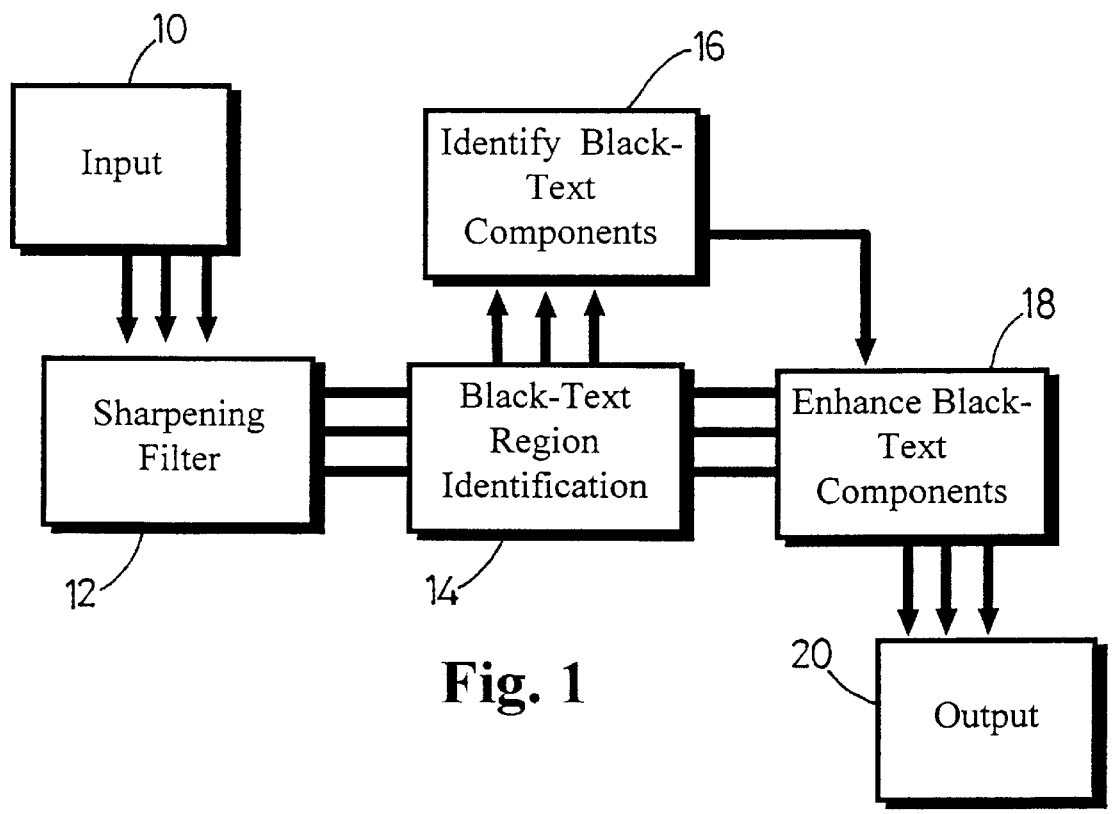
FIG. 1 is a block diagram illustrating the system overview.

In this embodiment, the processing steps of FIG. 1 are applied. RGB data, typically 8 bits per channel, is received from an input device 10 such as a scanner, and initially subjected at 12 to a sharpening filter to improve the quality of both text and non-text regions.

The image is then roughly segmented at 14 into areas that are likely to be black text on a plain white or lightly-coloured background and those that are not. This step is referred to herein as "page analysis", and the segmented areas are referred to as "text areas" and "non-text areas" respectively. The text areas are then processed at 16 to identify for enhancement each individual black text item therein, such as text glyphs, broken text glyphs, punctuation etc.

The preliminary identification of text areas reduces significantly the overall computational load and thus processing time, and also prevents, to a significant degree, the introduction of unwanted artefacts in non-text areas as a result of the enhancement process. Also we have found that the rendition of non-text areas and continuous tone areas do not normally require, or benefit from, special enhancement.

Having identified all black text components in a text area, these components are enhanced at 18, by snapping to black the RGB values of pixels that form the component, and snapping to white or another pre-set light background colour a halo of pixels surrounding the item, to provide a clean black text item with a crisp black/white edge, without discolouration. Finally, the treated data is supplied to an output device 20 which may include a colour pipeline which converts the RGB data to 4 bit CYMK data for printing, storage or other use.

Figure 2:
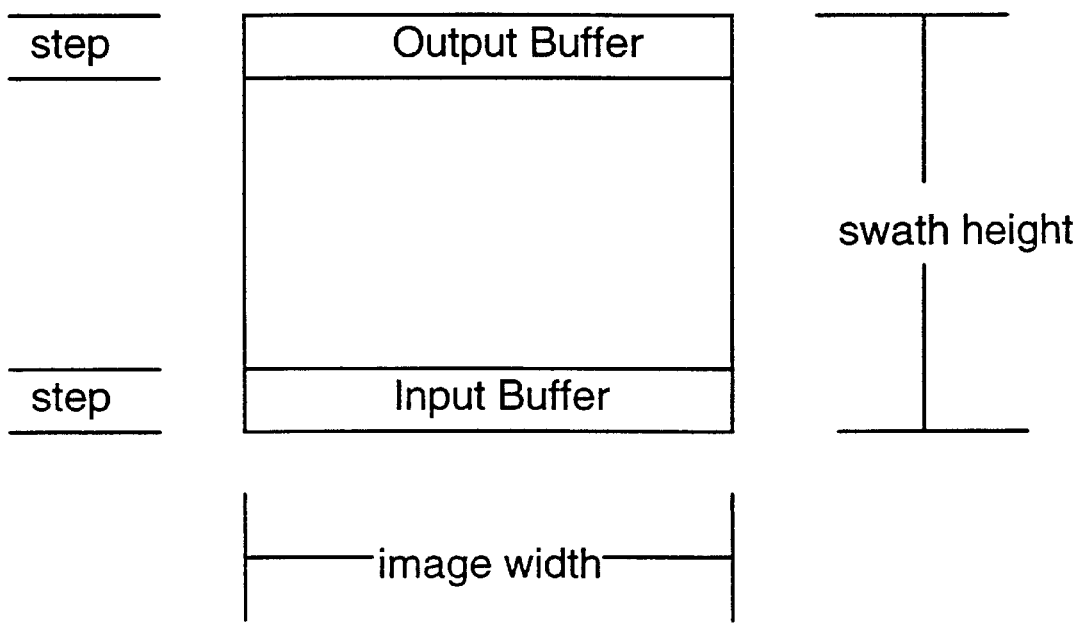
FIG. 2 is a schematic diagram illustrating the swath structure used in the swath processing technique employed in this embodiment.
Figure 3:
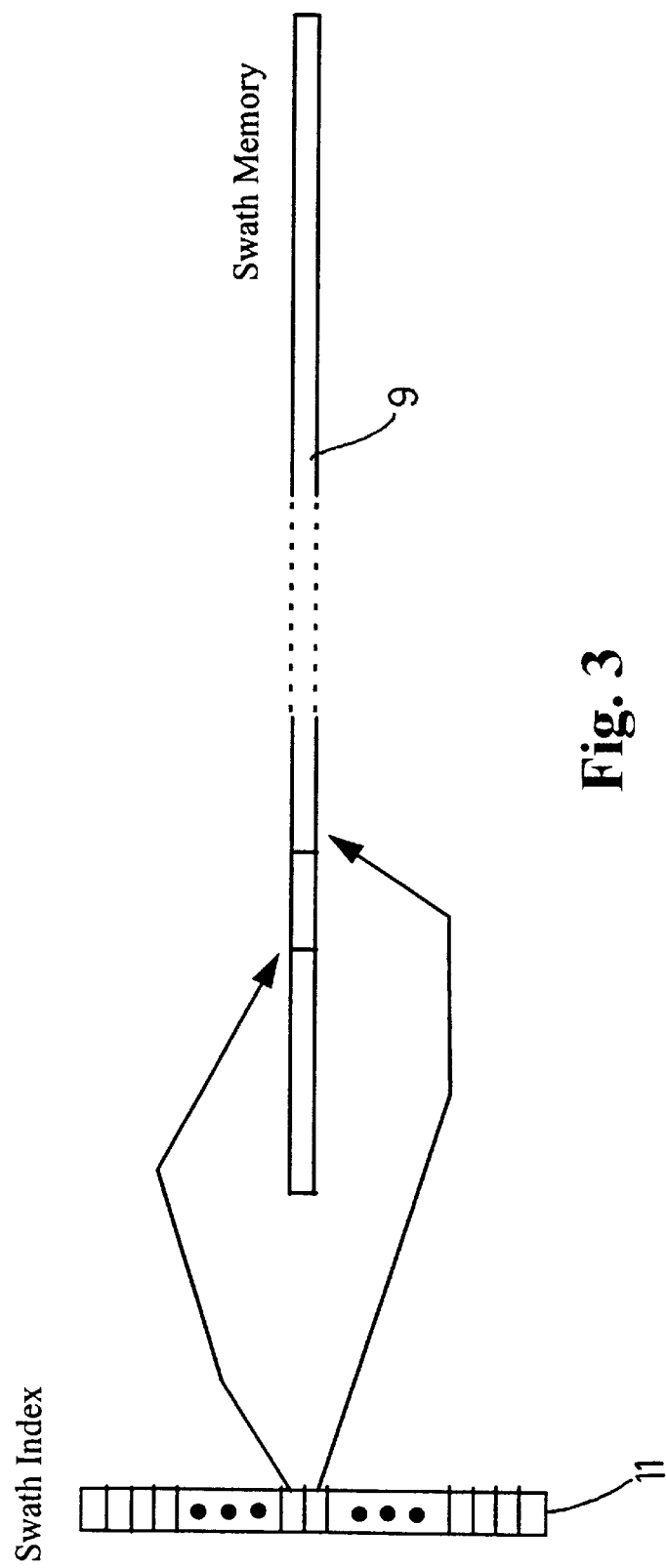
FIG. 3 is a schematic diagram illustrating the swath memory management.
Figure 4:
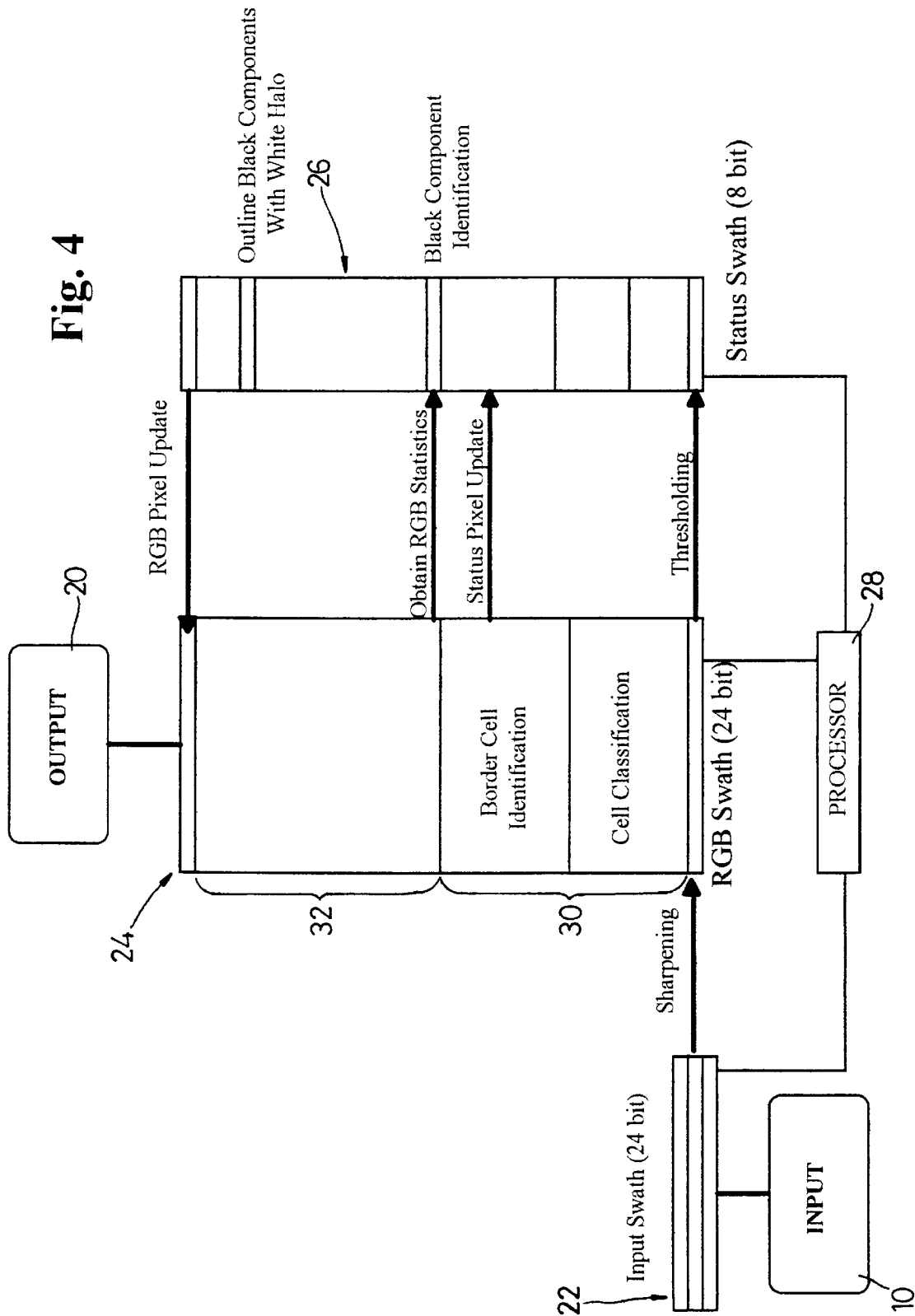
FIG. 4 is a schematic diagram showing the swath-based implementation of the image processing technique of this embodiment.

Referring to FIGS. 2 to 4, to avoid the need to read a whole page into memory before output can begin, the embodiment implements a processing technique whereby rolling image buffers or "swaths" as wide as the page move down the virtual image as it is processed, so that a sliding full-width window of the image is processed (FIG. 2). The height of the swath defines the number of scan rows of the image covered by the swath, and the step size of the swath defines by how much the swath is to be moved at each iteration (i.e. processing step). The height of the swath must be a multiple of the step size so that the bottom step eventually becomes the top step. The bottom and top steps may be thought of as input and output buffers respectively which can be compatible with the buffer -memory of the scanner or other equipment upstream.

As the swath is moved over the virtual image, new data is read into the input step at the bottom of the swath and processed data written from the step at the top. In this way pixel addressing is relative to the swath rather than the underlying virtual image. Hence each time the swath is moved relative to the image, the effect of applying a process to a fixed neighbourhood which must be a multiple of the step size (i.e. sets of rows) with respect to the swath will have the effect of acting on a different set of rows in the image. The swath based approach allows the process to be pipelined, maintains relevant history and allows area processes to be performed.

Referring to FIG. 3, for efficiency the swath memory 9 is accessed via an index table 11 each element of which addresses a single row of data in the swath memory 9. When the swath is moved, either to select further rows of data for processing or to store fresh rows of data, only the row addresses in the swath index are manipulated and not the data in the swath memory. Thus, each time the swath steps down the image, the row addresses step through the swath index such that, in the index 11, each row address is replaced by the one that was previously one step size below it (except of course for the row addresses of the bottom step which are replaced by those previously at the top of the index table).

The present embodiment of swath-based implementation of the image processing technique is shown in FIG. 4. Three data swaths are used, comprising two 24 bit per pixel RGB swaths, namely a small input swath 22, and a larger image swath 24 which receives sharpened image data from the input swath 22, and in which the black text enhancement is performed. The image swath 24 in turn uses an 8 bit deep status swath 26 that maintains status information for pixels in the image and is lock-stepped to the image swath 24. Processing, synchronisation and data pipelining are implemented and controlled by a processor 28.

Image data from the input device 10 is read into the bottom of the input swath 22 and image sharpening is applied to a central region of the input swath (to be described below) and the result is written to the bottom of the image swath 24.

The lower portion 30 of the image swath 24 is dedicated to an RGB histogramming page analysis technique (to be described below), with the upper portion 32 being dedicated to black text identification and enhancement, which again is described below. At the upper end of the image swath 24, the RGB data for pixels is updated in accordance with the status information which has been generated and stored in the status swath 26, and the enhanced page output at 20. Enhancement in this example consists of snapping the RGB values to black (i.e. 0, 0, 0) for those that have their status pixel in the status swath 26 set for snapping to black, and to white (i.e 255, 255, 255) those pixels whose status pixel in the status swath 26 indicates that they have been identified as part of the halo. The separation in the image and status swaths 24, 26, between the onset of black component identification and final enhancement determines the component height over which component statistics may be accumulated and hence the robustness of the method.

IMAGE SHARPENING

The pixel data in the input swath 22 is sharpened by accentuating the high frequency components of the image to make the edges of text and other items both sharper and darker. In this embodiment, this is done by applying a 5×5 block average spatial image filter (see FIG. 5) to each of the RGB channels of the image to provide a low pass version of the image and then subtracting the low pass version from the original to obtain a high pass version of the image, i.e.

Highpass=original−Lowpass

The original version is then weighted with a proportion (A) of the highpass version to provide a high-boost filter, thus High-boost=Original+A.(Highpass)

PAGE ANALYSIS

Page analysis segregates the page into areas of text or non-text. Broadly, this is done by monitoring the RGB intensities at each pixel within each of a number of preset "cells" within the image to determine whether the pixels in the cell are predominantly background with only a relatively small proportion of foreground. A cell satisfying this criteria is classified as a text area. In FIG. 6, on the left there is a representation of a page which includes a mixture of text and non-text (image), and on the right the page has been classified into text and non-text areas.

In detail, page analysis is carried out in two or more stages. Firstly, the page is divided into an array of cells, and individual cells are analysed on the basis of RGB histograms (discussed below) and given an initial classification as text areas/non-text areas.

In one solution, for discriminating black text for each cell, 1-D histograms are constructed for each RGB colour channel, relating colour intensity to frequency of occurrence in that cell. The overall intensity range (0 to 256 for 8 bit colour signal) is quantised into one of 64 bins, to reduce memory and processing power requirements and to improve robustness of the interpretation.

Figure 7:
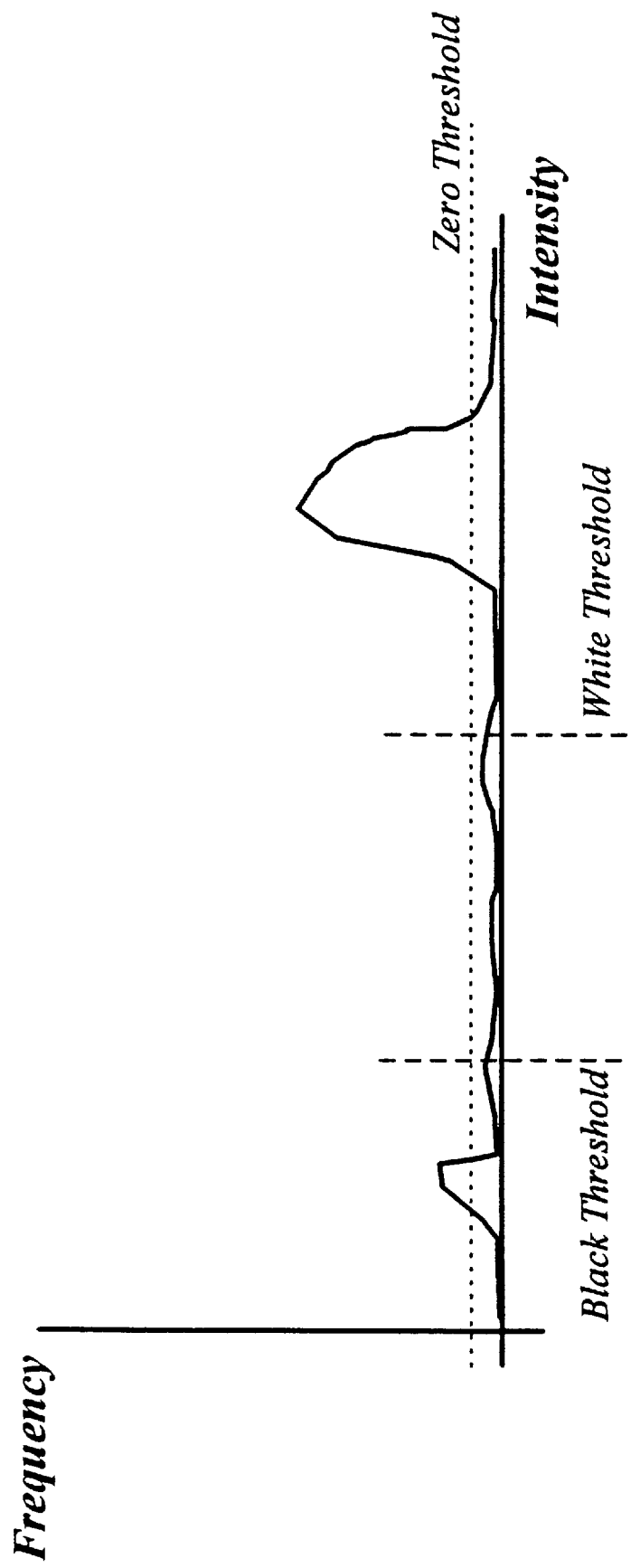
FIG. 7 is a typical 1-D histogram of intensity for a colour signal in a cell identified as a text area.

Referring to FIG. 7, for a cell to be identified as a text area in this embodiment, all three colour channels must satisfy the following black text histogram test, with four threshold parameters:

black intensity threshold: a maximum for black text pixels white intensity threshold: a minimum for white text pixels zero histogram threshold: expected baseline histogram activity background histogram threshold: area of histogram above the white intensity threshold.

A text area, i.e. one containing black text on a white or lightly coloured background, is defined to have, for each colour channel, activity below the zero histogram threshold for each histogram bin between the black intensity and white intensity thresholds, and activity above the background histogram intensity accumulated into bins above the white intensity threshold.

In an alternative technique for discriminating black and white, as well as plain contrasting colours, instead of basing the test for text adjudication on individual peak values in each of the colour channel histograms, cells may be classified on the basis of identification of peaks in the 3-D (r,g,b) histogram, effectively to find the most commonly occurring (r,g,b) triplets. The peaks are then examined and a cell is classified as a text cell if there is a dominant peak which is very light (for example where all 8 bit channels have intensities greater than 160) and, possibly, a smaller dark peak; otherwise the cell is classified a non-text cell. To reduce the computational task, instead of examining the frequency of all possible permutations of r,g,b triplets ($2^{24}$ in all) the histogram for each channel is analysed to guide the peak identification process. Thus, peaks in each 1-D channel histogram are identified by assigning to each peak indices based upon their ordinal value. These indices now define restricted search space cuboids in the 3-D space representing possible peaks. The triplet values in the cuboids are visited again to accumulate values corresponding to each cuboid thereby to identify the most commonly occurring triplets. The actual computation for each pixel, including testing of which, if any, of the possible 3-D peaks it is a member can be made very cheap in terms of computation and memory. In general, a text area will have a highly-populated cuboid corresponding to white or background and possibly a highly-populated cuboid corresponding to black, with no other highly-populated cuboids.

As a result of page analysis, the image is decomposed into areas of potential text and non text.

BLACK TEXT ENHANCEMENT

In outline, the sharpened image data is input to the foot of the RGB swath 24, and the pixels in each row are thresholded in the green channel to identify pixels that may make up potential text components and to initialise the corresponding status pixels at the foot of the status swath 26. Connected component analysis is applied by the processor 28 to build up potential text components. The RGB statistics of the pixels making up the potential text components are then analysed by the processor 28 to determine whether the potential text component is black or near black and, if so, the component is selected for enhancement. This consists of setting the constituent status pixels for snapping to black, and setting a halo of neighbouring status pixels for snapping to white. This halo is identified on a row-by-row basis at the top of the status swath where the interpretation of the component pixels is stable. Finally, at the top of the image swath 24, the status information is used to update the corresponding RGB swath pixels and the enhanced page is output at 20.

Initial identification of potential black text components is based on intensity thresholding in the green channel (G) alone, and two maximum thresholds are used:

T1: to identify support component pixels
T2: to identify black component pixels, where T1>T2, i.e. the threshold for identifying support component pixels is "lighter" than that identifying black component pixels.

Referring to FIGS. 8(a) to 8(c), and 9(a) and (b), the use of two thresholds gives two important advantages. Given that a raw image may have blurred or effaced text outlines, the use of two thresholds allows the flexibility of joining fragmented black text components to collect more robust colour estimates without affecting final character thickness. Also it allows the identification of "support pixels", having an intensity between the two thresholds, which gives a further useful indication of whether a portion of a page is a text component or an image or dither pattern. Black text components will have relatively few support pixels (see FIG. 8(c)), whereas parts of an image or dither pattern that are below T1 (the black component threshold) will tend to have large support neighbourhoods of pixels.

Figure 8A:
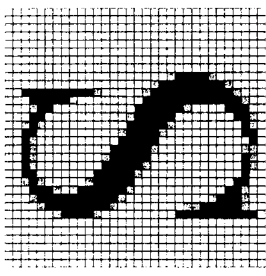
FIGS. 8(*a*) to 8(*c*) are diagrams explaining the use of two thresholds on black text.
Figure 8B:
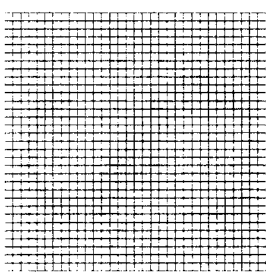
Figure 8C:
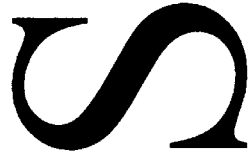

Thus, referring to FIGS. 8(a) to (c), if the text glyph in FIG. 8(a) is quantized during the scanning process to the gird in FIG. 8(b), pixels below the thresholds T1, T2 would be as shown in FIG. 8(c). If used alone, threshold T1 would produce too heavy a representation of the text, while threshold T2 would break up the component (see for example the lower left extension) and thus would make discrimination less robust for the smaller fragment because it would not be seen as part of the larger component. Using the two threshold approach de-couples black-text glyph identification from black pixel enhancement.

Figure 9A:
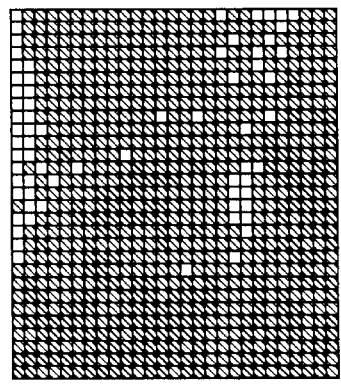
FIGS. 9(*a*) and (*b*) are views of a continuous tone region, and that region thresholded with two values, respectively.
Figure 9B:
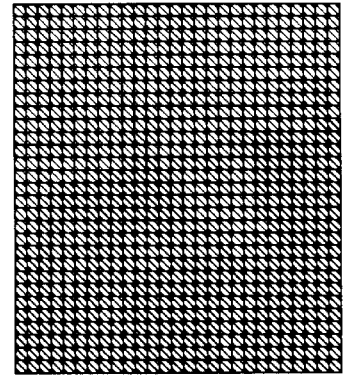

Turning to FIGS. 9(a) to (c), pixels below the two thresholds for the green channel contone image region in FIG. 9(a) are shown in FIG. 9(b). While green pixels exist below threshold T2 and hence are dark enough to be snapped to black, the associated support pixels that define the component (i.e. below T1) dominate. Using two thresholds helps discriminate contone image from text (or other monotone) components.

Figure 10:
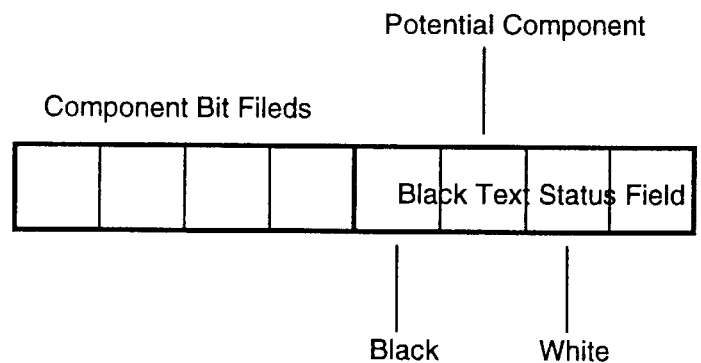
FIG. 10 illustrates the significance of the black status fields of the status pixels.

The RGB data is processed row by row and the status of pixels with respect to each of the two thresholds T1, T2 is made explicit in the status swath 26. Within each byte of the status swath, two of the top 4 bits are used by the connected component growing method discussed below, while the lower nibble describes the current black text status of the pixel. FIG. 10 shows how the black text status field is constrained; while the black status part of the byte can be thought of as a whole, only a limited set of values are in fact permissible such that:

If the black status is 0, this is a non-text pixel,
If the white bit is set, snap this pixel white during the component enhancement phase,
If the component bit or the black bit is set, this pixel satisfies the black component formation threshold,
If the black bit is set, snap this pixel to black during the component enhancement phase.

The important values are:

| B | C | W | T2 | | | |
|---|---|---|----|---|---|---|
| 0 | 0 | 0 | 0 | 0 | Not Set | NOT_SET |
| 0 | 0 | 1 | 0 | 2 | White Halo Pixel to Snap to White | WHITE |
| 0 | 1 | 0 | 0 | 4 | Less Than Threshold T1 | T1_COMPONENT |
| 0 | 1 | 0 | 1 | 5 | Less Than Threshold T2 | T2_COMPONENT |
| 1 | 0 | 0 | 0 | 8 | Text Component Pixel to Snap to Black | BLACK |

As a result of thresholding, the status pixels will be assigned one of the values NOT_SET, T1_COMPONENT, or T2_COMPONENT.

Figure 11:
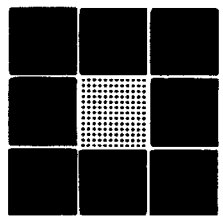
FIG. 11 illustrates 8-neighbour connectivity.

RGB statistics collected over connected status pixels that have their black status field set to either T1_COMPONENT or T2_COMPONENT (i.e. the component bit of the black status field is set) form the basis of black text item discrimination. There are a variety of published image processing methods for determining connectivity of pixels. Here connectivity is defined on an 8-neighbour basis. A pair of pixels is said to be 8-neighbour connected if they are adjacent in the lattice, including diagonal adjacency (see FIG. 11). Hence two pixels are defined as connected if an 8-neighbour path exists between them. A connected component is a subset which exclusively defines a group which are all mutually connected.

In this embodiment, text components are grown on a line by line basis from information within the status swath 26. As the swath has a vertical extent that is less than the page as a whole it is possible for part of a component to exit the swath before all the pixels that compose it can be identified.

Figure 12:
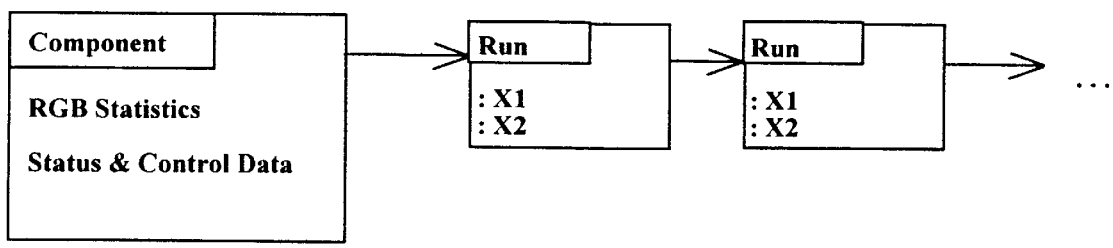
FIG. 12 illustrates schematically how data identifying connected components is represented and stored, pending identification as a black component.

The description of individual text components is maintained by processor 28. It consists of just the list of pixel runs that exist on the current status swath row (see FIG. 12). Furthermore only the list of currently active components is maintained. As each subsequent row of the status swath is processed the list of currently active components is updated to reflect their continuation onto the new image row. The RGB statistics for the pixels making up the run(s) are collected and stored with data identifying the run.

During the generation of text components the appropriately labelled status pixels are fist grouped into contiguous runs which make explicit their connectivity along the current row. Components are then extended by identifying 8-neighbour connectivity between these runs of pixels and those that describe the current state of the component (i.e. those extracted from the previous row).

Figure 13:
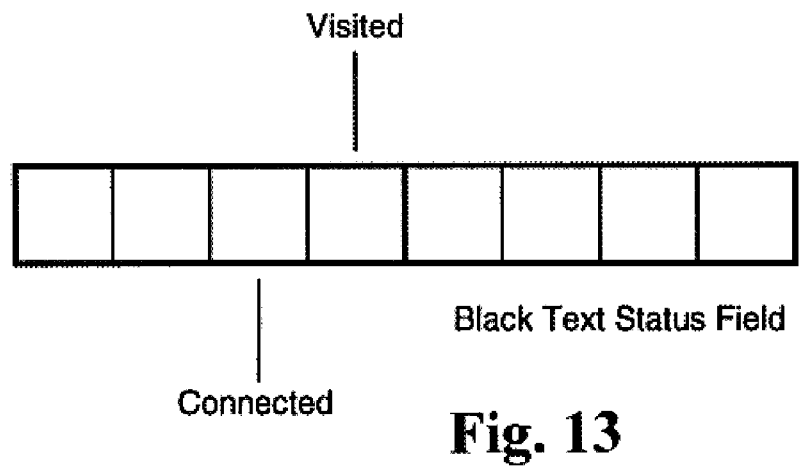
FIG. 13 illustrates the significance of the component bit fields of the status pixel.

The following outcomes can occur:
    At the component level
    New components can be created
    Existing components can be merged
    Existing components can terminate
    At the individual run level
    Existing runs can be simply extended
    Existing runs can merge
    Existing runs can be split into N new runs
    Existing runs can terminate The algorithm for growing connected components onto the current row uses a bit field in the status pixel (labelled connected in FIG. 13) to keep track of connected pixels, and is structured as follows:
    Define runs of connected status pixels on the current row
    For each component
        replace current list of pixel runs with the list of runs to which they are connected (8-neighbour) on the current row and set the connected bit field of the newly absorbed pixels.
    Merge components which now share a common run of pixels
    Delete components that did not find connections on the current row Create new components from runs on the current row that were not connected to (i.e. whose pixels do not have their component bit set)

For efficiency the list of connected components is kept ordered with respect to the pixel of each component on the current row. The list of runs within each component is also kept ordered.

Figure 14:
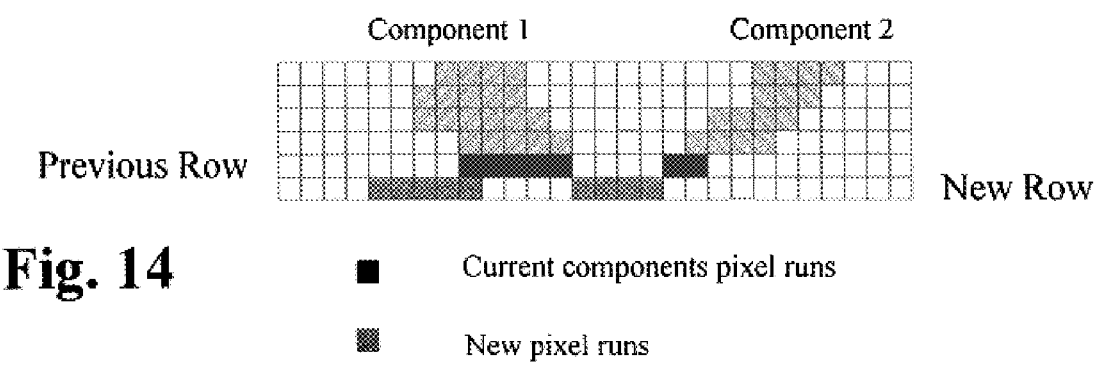
FIG. 14 illustrates an example of pixels in a text area where two components merge and then bifurcate.

A complex example of component analysis is given in FIG. 14. Here 2 existing components merge and bifurcate on the same scanline to create a single component with a list of 2 pixel runs in it. The pixels on the current row which define existing list of connected components are shown filled solid black. The appropriately labelled pixel runs on the new row are shown grey. Note that 8-neighbour connectivity between the existing component pixel runs and the new runs joins the components to form a single new component.

Once the connected components have been determined, the RGB data of the pixels making up the component are analysed from the RGB swath 24 to determine whether the component is black text.

Two principal criteria used to identify black text are:
    achromaticity (threshold on the maximum difference in the RGB channels)
    intensity (threshold on each of the RGB channels)

In the discrimination procedure, intensity and achromatic thresholding are performed on RGB statistics collected over individual text components that correspond to whole or partial character glyphs. These are extracted from the underlying pixel set in the main RGB swath 24 as the component is traversed.

The procedure for accumulating statistics for each new pixel run distinguishes between thin text and fat text or contone image pixels and is as follows:
    Let X1 and X2 be start and end of run
    If (X2−X1>LengthThreshold)
        /* treat as thick text or image */
        Ignore border pixels (i.e. only x¦x>X1+d and x<X2−d)
        For every Nth sample pixel
            Add RGB values to R, G, and B accumulators
            Increment stats counter
    Else
        /* treat as thin text */
        Extend search range 1 pixel each way (i.e. X1−− and X2++)
        Find minimum for each RGB channel
        Add minimum R, G and B values to R, G and B accumulators
        Increment stats counter Thus, the effect of colour misalignment in the image is minimised by ignoring border pixels for thick runs and by searching independently (over an extended search range) for a single contribution from each of the RGB channels for thin runs.

When two components merge to form a single new component then their statistics are combined. Either upon completion, or when sufficient statistics have been accumulated, the connected component that represents the potential text glyph is tested for suitability for black enhancement.

Achromatic and intensity thresholding outlined above are achieved by computing accumulated estimate of the average R, G, and B values from those over the component.

Black text enhancement requires
  1. R<Ti&G<Ti&B<Ti
  2. MAX(R, G, B)−MIN(R,G, B)<Ta where R, G, and B are accumulated values, Ti is the intensity threshold and Ta is the achromatic threshold. When a component satisfies these requirements the individual pixels that compose it are appropriately labelled. In the preferred embodiment the actual pixel coverage of the component is only implicitly defined and back-tracking over the pixel set is required. This is achieved by the following recursive procedure (although other techniques will be known to those skilled in the art) starting from the final run (or runs) of pixels that were seen at the bottom of the component.

BackTrack(currentstatusPixel)
    if visited bit set then exit
    if black status field is set to BLACK set it back to T2__COMPONENT
    set visited bit
    for each 8-neighbour that has black status field >=T1__ COMPONENT BackTrack(neighbour)

Note those component pixels that are traversed in this way set the visited bit of their component status bits (see FIG. 14).

As a component can be larger than the height of the swath it may be necessary to identify whether it is a black text item before the top of it reaches the top of the swath. Hence connected components are in fact tested at regular intervals during their growth (in the preferred embodiment they are tested every 32 image rows). This also reduces the amount of backtracking required as once a component has been identified as black text then as the component is grown further the black status value of pixels that are added to it are directly set for enhancement. Furthermore the statistics are re-initialised between tests, hence a component that may begin black but eventually is light or chromatic will quickly and robustly be identified.

When a component that has previously been identified as black text subsequently fails the black component criteria it is necessary to revisit those pixels that form part of the component (and still lie within the swath) and set the black status field value, of those currently set for snapping, back to T2_COMPONENT (i.e. back from (1 0 0 0) to (0 1 0 0)). This is done with a variant of the back tracking algorithm presented above. Once a component has once failed the regular test detailed above it is prevented from being selected for black text enhancement for the remainder of its existence.

Having identified pixels that form black text components by setting the black status field of their status byte to BLACK, the next step in text enhancement is to identify the halo of pixels that surround each text item and mark them in the status swath for snapping to white. This task is performed on a row by row basis on the nth from the top row of the status swath, where n is the size of halo. Any pixels in the halo with their black status field set to either NOT_SET or T1_COMPONENT are snapped to WHITE.

Figure 15:
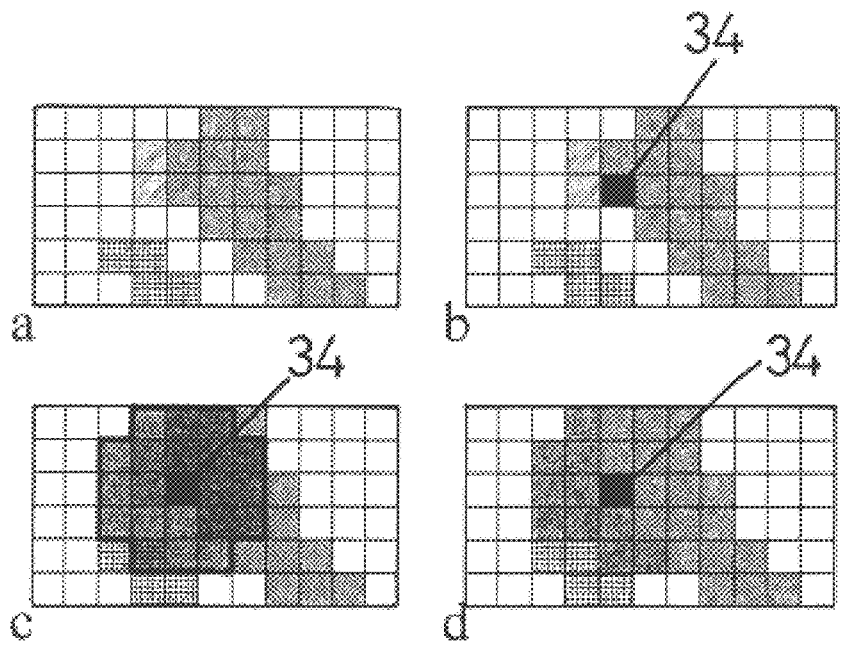
FIG. 15 illustrates the process of snapping to white pixels in a halo around a black text component.

FIG. 15(a) shows a region of a status swath. The region has pixels that have black status field set to NOT_SET (0000), SNAPPED to black (1000), T1_COMPONENT (0100) and T2_COMPONENT (0101). In FIG. 15(b) one of the pixels (referenced 34) that has been selected for snapping to black. All the pixels in a halo neighbourhood size of 2 around that pixel are identified in FIG. 15(c). In FIG. 12(d) pixels identified for snapping to WHITE (0010) are shown. This technique is applied to black pixels on a pixel by pixel, row by row basis, as the swath is moved over the image and hence the labelling is more complex than shown in the Figure as some pixels in the neighbourhood may have already been labelled WHITE due to processing of the previous row. Again, alternative techniques for neighbourhood analysis will be apparent to those skilled in the art.

Note that T1_COMPONENT pixels are snapped to white if they form part of the halo around the BLACK text component but T2_COMPONENT pixels are not. It is assumed that the latter form part of a near neighbouring component that is some colour other than black (or whose colour is borderline black).

On the top row of the image and status swath 24 and 26, the status information is used to update the RGB data. Pixels with black status field value BLACK have their RGB data values in the main swath set to a black intensity value (i.e. 0,0,0). Pixels with black status field value WHITE have their RGB data values in the main swath set to a white intensity value (i.e. 255, 255, 255). Finally the modified 24 bit RGB data is output from the top of the swath.

What is claimed is:

1. An image processing apparatus for processing colour signals representing a colour or black-and-white image, to enhance the rendering of black text in a subsequent presentation of said image, said apparatus comprising:
   (i) means for analysing at least one of said colour signals over said image or a part thereof to identify within said image or part thereof groups of neighbouring pixels, each of which defines a potential text item or part thereof;
   (ii) colour discriminating means for monitoring at least some of the colour signals of pixels within and/or around each potential text item to discriminate black text items; and
   (iii) means for enhancing said discriminated black text items in a subsequent presentation of said image
wherein said analysing means compares the intensity of said colour signal in each pixel with a first threshold and classifies each pixel having an intensity below said first threshold as belonging to a potential text item.

2. An image processing apparatus according to claim 1, including means for storing data identifying each potential text item and the pixels belonging thereto.

3. An image processing apparatus for processing colour signals representing a colour or black-and-white image, to enhance the rendering of black text in a subsequent presentation of said image, said apparatus comprising:
   (i) means for analysing at least one of said colour signals over said image or a part thereof to identify within said image or part thereof groups of neighboring pixels, each of which defines a potential text item or part thereof;
   (ii) colour discriminating means for monitoring at least some of the colour signals of pixels within and/or around each potential text item to discriminate black text items; and
   (iii) means for enhancing said discriminated black text items in a subsequent presentation of said image,
wherein said colour signals comprise red, blue and green colour signals, and said means for analysing analyses said green colour signal.

4. An image processing apparatus for processing colour signals representing a colour or black-and-white image, to enhance the rendering of black text in a subsequent presentation of said image, said apparatus comprising:
   (i) means for analysing at least one of said colour signals over said image or a part thereof to identify within said image or part thereof groups of neighbouring pixels, each of which defines a potential text item or part thereof;
   (ii) colour discriminating means for monitoring at least some of the colour signals of pixels within and/or around each potential text item to discriminate black text items; and
   (iii) means for enhancing said discriminated black text items in a subsequent presentation of said image,
wherein said colour signals comprise red, blue and green colour signals and said colour discriminating means monitors the red, green and blue intensities of each of the pixels making up each potential text item.

5. An image processing apparatus according to claim 4, wherein said colour discriminating means includes, for each colour signal, means for determining maximum, minimum and mean values of the intensity of the colour signal in the pixels making up a potential text item, and said colour discriminating means uses said maximum, minimum and mean values to discriminate a black text item.

6. An image processing apparatus for processing colour signals representing a colour or black-and-white image, to enhance the rendering of black text in a subsequent presentation of said image, said apparatus comprising:
   (i) means for analysing at least one of said colour signals over said image or a part thereof to identify within said image or part thereof groups of neighbouring pixels, each of which defines a potential text item or part thereof;

(ii) colour discriminating means for monitoring at least some of the colour signals of pixels within and/or around each potential text item to discriminate black text items; and (iii) means for enhancing said discriminated black text items in a subsequent presentation of said image wherein said means for enhancing sets each of the pixels within each discriminated black text item to black and said means for enhancing sets to black only those pixels where the intensity of said colour signal is below a second threshold, lower than said first threshold.

7. An image processing apparatus for processing colour signals representing a colour or black-and-white image, to enhance the rendering of black text in a subsequent presentation of said image, said apparatus comprising:

(i) means for analysing at least one of said colour signals over said image or a part thereof to identify within said image or part thereof groups of neighbouring pixels, each of which defines a potential text item or part thereof;

(ii) colour discriminating means for monitoring at least some of the colour signals of pixels within and/or around each potential text item to discriminate black text items; and (iii) means for enhancing said discriminated black text items in a subsequent presentation of said image, wherein said means for enhancing sets each of the pixels within each discriminated black text item to black and said means for enhancing includes means for setting selected pixels adjacent said discriminated black text items to white or another suitable background colour.

8. An image processing apparatus for processing colour signals representing a colour or black-and-white image, to enhance the rendering of black text in a subsequent presentation of said image, said apparatus comprising:

(i) means for analysing at least one of said colour signals over said image or a part thereof to identify within said image or part thereof groups of neighbouring pixels, each of which defines a potential text item or part thereof;

(ii) colour discriminating means for monitoring at least some of the colour signals of pixels within and/or around each potential text item to discriminate black text items;

(iii) means for enhancing said discriminated black text items in a subsequent presentation of said image;

(iv) means for classifying said image into potential test regions and non-text regions, said means for classifying including:

(a) means for monitoring the intensities of at least some of the colour signals at a plurality of pixels within a selected region of said image;

(b) means for monitoring said monitored intensities to determine intensity distribution data for the or each colour signal; and (c) means responsive to said distribution data to classify said selected region as a text region or a non-text region, and (v) means for supplying image data representing said potential text regions to said means for analysing, wherein the intensity distribution data is compared with respective preset threshold data to classify said selected region and wherein said threshold data defines a black intensity maximum threshold and a white intensity minimum threshold, and said selected region is classified as a text region if the intensity distribution data for the or each of the said colour signals does not include a peak between said black intensity maximum threshold and said white intensity minimum threshold, and also meets at least one of the following conditions:

(i) it includes a peak above said white intensity minimum threshold and, (ii) it includes a peak below said black intensity maximum threshold.

9. An image processing apparatus for processing colour signals representing a colour or black-and-white image, to enhance the rendering of black text in a subsequent presentation of said image, said apparatus comprising:

(i) means for analysing at least one of said colour signals over said image or a part thereof to identify within said image or part thereof groups of neighbouring pixels, each of which defines a potential text item or part thereof;

(ii) colour discriminating means for monitoring at least some of the colour signals of pixels within and/or around each potential text item to discriminate black text items;

(iii) means for enhancing said discriminated black text items in a subsequent presentation of said image;

(iv) means for classifying said image into potential test regions and non-text regions, said means for classifying including:

(a) means for monitoring the intensities of at least some of the colour signals at a plurality of pixels within a selected region of said image;

(b) means for monitoring said monitored intensities to determine intensity distribution data for the or each colour signal; and (c) means responsive to said distribution data to classify said selected region as a text region or a non-text region, and (v) means for supplying image data representing said potential text regions to said means for analysing;

(vi) means for examining said intensity distribution data for each colour signal to identify peaks therein;

(vii) means responsive to said examining means to use said peaks to define potentially highly populated search spaces; and, (viii) means for monitoring the population in each of said search spaces thereby to classify said selected region as a text region or a non-text region.

10. An image processing apparatus for processing colour signals representing a colour or black-and-white image, to enhance the rendering of black text in a subsequent presentation of said image, said apparatus comprising:

(i) means for analysing at least one of said colour signals over said image or a part thereof to identify within said image or part thereof groups of neighbouring pixels, each of which defines a potential text item or part thereof;

(ii) colour discriminating means for monitoring at least some of the colour signals of pixels within and/or around each potential text item to discriminate black text items;

(iii) means for enhancing said discriminated black text items in a subsequent presentation of said image; and, (iv) means for storing a sliding window or swath of said image, wherein said means for analysing operates on data stored in said sliding window or swath.

* * * * *